(12) United States Patent
Jeong et al.

(10) Patent No.: US 12,291,630 B2
(45) Date of Patent: May 6, 2025

(54) METHOD FOR PREPARING CONJUGATED DIENE-BASED POLYMER

(71) Applicant: LG CHEM, LTD., Seoul (KR)

(72) Inventors: Young Hwan Jeong, Daejeon (KR); Yoo Vin Kim, Daejeon (KR); Jin Hyoung Lee, Daejeon (KR); Jae Won Heo, Daejeon (KR); Young Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 665 days.

(21) Appl. No.: 17/615,386

(22) PCT Filed: Sep. 23, 2020

(86) PCT No.: PCT/KR2020/012872
§ 371 (c)(1),
(2) Date: Nov. 30, 2021

(87) PCT Pub. No.: WO2021/060833
PCT Pub. Date: Apr. 1, 2021

(65) Prior Publication Data
US 2022/0227987 A1  Jul. 21, 2022

(30) Foreign Application Priority Data

Sep. 27, 2019 (KR) .................. 10-2019-0119589

(51) Int. Cl.
*C08L 25/10* (2006.01)
*C08L 51/00* (2006.01)

(52) U.S. Cl.
CPC .................. *C08L 51/003* (2013.01)

(58) Field of Classification Search
CPC ........ C08L 51/003; C08L 55/02; C08L 25/10; C08L 25/12; Y02T 10/86; C08F 2/26; C08F 4/34; C08F 6/22; C08F 136/02; C08F 279/02; C08F 279/04; C08F 36/04; C08F 2/38; C08F 136/06; C08F 6/18; C08F 2/24; C08F 4/40
See application file for complete search history.

(56) References Cited

U.S. PATENT DOCUMENTS

| | | | |
|---|---|---|---|
| 2009/0076205 A1 | 3/2009 | Huang et al. | |
| 2017/0226236 A1 | 8/2017 | Lee et al. | |
| 2018/0030173 A1 | 2/2018 | Kang | |
| 2018/0030174 A1 | 2/2018 | Kang | |
| 2018/0037675 A1 | 2/2018 | Kang | |
| 2018/0044452 A1 | 2/2018 | Kang | |
| 2018/0340035 A1 | 11/2018 | Lee et al. | |
| 2018/0362750 A1 | 12/2018 | Lee | |
| 2019/0016841 A1 | 1/2019 | Han | |
| 2019/0023894 A1 | 1/2019 | Han | |
| 2019/0367648 A1 | 12/2019 | Kang | |
| 2020/0123289 A1 | 4/2020 | Kang | |
| 2020/0407478 A1 | 12/2020 | Chai et al. | |
| 2021/0163736 A1 | 6/2021 | Chai | |

FOREIGN PATENT DOCUMENTS

| | | | | |
|---|---|---|---|---|
| CN | 107306496 A | 10/2017 | | |
| CN | 108368189 A | 8/2018 | | |
| EP | 3315520 A1 | * 5/2018 | ............... | B60C 1/00 |
| EP | 3363819 A1 | * 8/2018 | ......... | B29C 45/0001 |
| EP | 3363833 A1 | * 8/2018 | ............ | C08F 279/04 |
| EP | 3 381 957 A1 | 10/2018 | | |
| EP | 3 385 292 A1 | 10/2018 | | |
| JP | H08253647 A | 10/1996 | | |
| JP | 2017-538799 A | 12/2017 | | |
| JP | 2018-508620 A | 3/2018 | | |
| JP | 2018-537568 A | 12/2018 | | |
| JP | 2019-502002 A | 1/2019 | | |
| KR | 20100038700 A | 4/2010 | | |
| KR | 101264467 B1 | 5/2013 | | |
| KR | 101279267 B1 | 6/2013 | | |
| KR | 101487185 B1 | 1/2015 | | |
| KR | 20160077627 A | * 7/2016 | | |
| KR | 20160078288 A | * 7/2016 | | |
| KR | 20170098001 A | * 8/2017 | | |
| KR | 10-2018-0048277 A | 5/2018 | | |
| KR | 20180047748 A | * 5/2018 | | |
| KR | 20180047749 A | 5/2018 | | |
| KR | 20190095880 A | * 8/2019 | | |
| WO | WO2006039860 | 4/2006 | | |

OTHER PUBLICATIONS

The Extended European Search Report for European Patent Application No. 20868281.5, dated Nov. 3, 2022.

* cited by examiner

Primary Examiner — Kumar R Bhushan

(57) ABSTRACT

The present invention relates to a method for preparing a conjugated diene-based polymer, characterized in using a dimer acid saponified material as an emulsifier in a polymerization initiation step and injecting a monomer and the emulsifier in three or more installments after initiating polymerization, and the conjugated diene-based polymer prepared by the preparation method of the present invention has excellent physical properties such as impact strength and reflection haze.

15 Claims, No Drawings

METHOD FOR PREPARING CONJUGATED DIENE-BASED POLYMER

CROSS-REFERENCE TO RELATED APPLICATIONS

The present application is a National Phase of International Application No. PCT/KR2020/012872 filed on Sep. 23, 2020, which claims the benefit of priority based on Korean Patent Application No. 10-2019-0119589, filed on Sep. 27, 2019, the entire contents of which are incorporated herein by reference.

TECHNICAL FIELD

The present invention relates to a method for preparing a conjugated diene-based polymer, and particularly, to a method for preparing a conjugated diene-based polymer, wherein a dimer acid saponified material is used in a polymerization initiation step, and a monomer and an emulsifier are injected in three or more installments after initiating polymerization reaction.

BACKGROUND ART

Acrylonitrile-butadiene-styrene (ABS) copolymer resins have relatively good physical properties such as moldability and degree of gloss as well as mechanical strength such as impact resistance and are widely used in electrical components, electronic components, office machines, automobile parts, etc.

ABS resins prepared through an emulsion polymerization method have advantages of showing relatively good balance of physical properties and excellent gloss. Accordingly, the ABS resins are mainly prepared by an emulsion polymerization method than a bulk polymerization method. The ABS resins prepared by the emulsion polymerization method may be mixed and processed with a styrene-acrylonitrile (SAN) copolymer to maximally utilize the properties of the composition of the SAN resin for diversification of products, and achieving high value-added creation.

Meanwhile, the degree of gloss or reflection haze of the ABS resin may be influenced by the size of the particle diameter and the particle distribution of a rubber polymer dispersed, and influenced by a gas generated at the surface of the resin due to impurities such as an emulsifier, a residual monomer, an oligomer, a thermal stabilizer, SAN, etc., remaining after polymerizing polybutadiene latex (PBL) and ABS during an injection process at a high temperature. Particularly, the gas generated at the surface of the resin during the injection process at a high temperature has an adverse effect on the roughness of the surface and largely degrades the degree of gloss or reflection haze of the resin, and is known as a factor limiting the improvement of the quality of the resin.

PRIOR ART DOCUMENT (Patent Document 1) KR 10-1279267 B1

DISCLOSURE OF THE INVENTION

Technical Problem

The present invention is devised to solve the defects of the conventional technique, and an object is to provide a method for preparing a conjugated diene-based polymer which may be included in a thermoplastic resin to improve impact strength and surface reflection haze, and reduce the generation amount of a gas during injection.

In addition, another object of the present invention is to provide a method for preparing a graft copolymer including the conjugated diene-based polymer, and a thermoplastic resin composition including the graft copolymer.

Technical Solution

In order to solve the tasks, the present invention provides a method for preparing a conjugated diene-based polymer, including injecting 30 to 50 parts by weight of a conjugated diene-based monomer among 100 parts by weight, 0.1 to 5 parts by weight of a dimer acid saponified material, and a polymerization initiator into a reactor in one batch, and initiating polymerization reaction (S1), injecting the remaining conjugated diene-based monomer and an emulsifier in three or more installments according to a polymerization conversion ratio after initiating the polymerization reaction (S2), and finishing the polymerization reaction at a point where the polymerization conversion ratio is 90 to 99% (S3).

In addition, the present invention provides a method for preparing the conjugated diene-based polymer, wherein step S2 includes injecting the conjugated diene-based monomer and the emulsifier at a point where the polymerization conversion ratio is 20 to 35% (S2-1), injecting the conjugated diene-based monomer and the emulsifier at a point where the polymerization conversion ratio is 45 to 60% (S2-2), and injecting the conjugated diene-based monomer and the emulsifier at a point where the polymerization conversion ratio is 70 to 80% (S2-3).

Advantageous Effects

By using the method for preparing a conjugated diene-based polymer provided in the present invention, the impact strength and surface reflection haze of a thermoplastic resin including the conjugated diene-based polymer prepared by increasing the standard deviation of the particle diameter of the conjugated diene-based polymer thus prepared may be improved, and the generation amount of a gas during an injection process of the thermoplastic resin may be reduced.

BEST MODE FOR CARRYING OUT THE INVENTION

Hereinafter, the present invention will be described in more detail.

It will be understood that words or terms used in the specification and claims shall not be interpreted as the meaning defined in commonly used dictionaries. It will be understood that the words or terms should be interpreted as having a meaning that is consistent with their meaning in the technical idea of the invention, based on the principle that an inventor may properly define the meaning of the words or terms to best explain the invention.

The conjugated diene-based monomer of the present invention may be one or more selected from the group consisting of 1,3-butadiene, isoprene, chloroprene and piperylene, and among them, 1,3-butadiene may be preferable.

The aromatic vinyl-based monomer may be one or more selected from the group consisting of styrene, α-methylstyrene, α-ethylstyrene and p-methylstyrene, and among them, styrene is preferable.

In the present invention, the vinyl cyan-based monomer may be one or more selected from the group consisting of acrylonitrile, methacrylonitrile, ethacrylonitrile, phenylacrylonitrile and α-chloroacrylonitrile, and among them, acrylonitrile is preferable.

In the present invention, "derived unit" means a unit derived from a corresponding compound, particularly, may mean the corresponding compound itself or a substituent from which partial atoms of the corresponding compound are removed.

In the present invention, the average particle diameter of the conjugated diene-based polymer and the standard deviation of the particle diameter may be measured through a particle size analyzer of Nicomp Co., particularly, may be measured by diluting a polymer sample which is a target to be measured and reading the average particle diameter of intensity Wt and the standard deviation of the particle diameter.

Method for Preparing Conjugated Diene-Based Polymer

The present invention provides a method for preparing a conjugated diene-based polymer, including injecting 30 to 50 parts by weight of a conjugated diene-based monomer among 100 parts by weight, 0.1 to 5 parts by weight of a dimer acid saponified material, and a polymerization initiator into a reactor in one batch, and initiating polymerization reaction (S1), injecting the remaining conjugated diene-based monomer and an emulsifier in three or more installments according to a polymerization conversion ratio after initiating the polymerization reaction (S2), and finishing the polymerization reaction at a point where the polymerization conversion ratio is 90 to 99% (S3).

1) Polymerization Initiation Step

The method for preparing a conjugated diene-based polymer provided in the present invention includes a step of injecting 30 to 50 parts by weight of a conjugated diene-based monomer among 100 parts by weight, a dimer acid saponified material and a polymerization initiator into a reactor in one batch and initiating polymerization reaction.

The conjugated diene-based monomer injected in this step may be 30 to 50 parts by weight, preferably, 35 to 45 parts by weight based on total 100 parts by weight of the conjugated diene-based monomer which is the target to be polymerized. If the conjugated diene-based monomer is injected in the above-described range in the polymerization initiation step, the standard deviation of the particle diameter of the conjugated diene-based polymer finally prepared may become large.

In this step, the dimer acid saponified material and the polymerization initiator are injected together with the conjugated diene-based monomer. In the present invention, the dimer acid saponified material plays the role of an emulsifier. The dimer acid may be one or more selected among the compounds represented by Chemical Formulae 1 to 6 below.

[Chemical Formula 1]

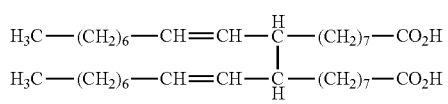

[Chemical Formula 2]

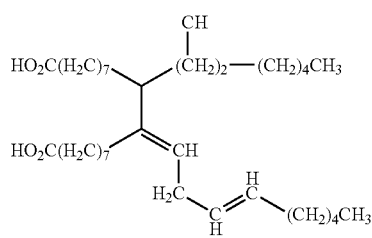

[Chemical Formula 3]

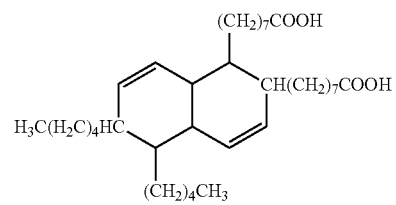

[Chemical Formula 4]

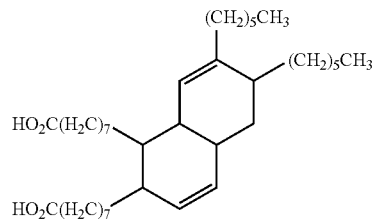

[Chemical Formula 5]

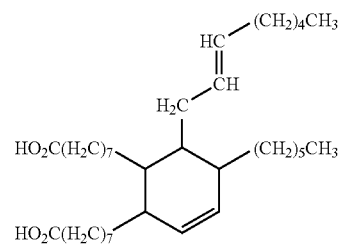

[Chemical Formula 6]

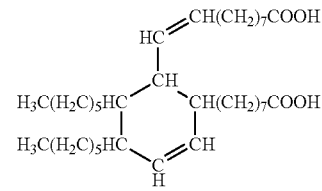

The saponified material refers to the metal salt of carboxylic acid produced by the saponification reaction of an acid, for example, an alkali metal salt or an alkaline earth metal salt, particularly, a sodium salt, a potassium salt, a magnesium salt or a calcium salt.

The polymerization initiator is for performing the role of initiating polymerization reaction and may be one or more among a water-soluble polymerization initiator, and a mixture of an oil-soluble polymerization initiator and an oxidation-reduction system catalyst, and a combination thereof may be particularly preferably used.

Particularly, the water-soluble polymerization initiator may be one or more selected from the group consisting of potassium persulfate, sodium persulfate and ammonium persulfate, the oil-soluble polymerization initiator may be one or more selected from the group consisting of cumene hydroperoxide, diisopropylbenzene hydroperoxide, azobisisobutyronitrile, tert-butyl hydroperoxide, paramenthane hydroperoxide, and benzoyl peroxide, and the oxidation-reduction system catalyst may be one or more selected from the group consisting of sodium formaldehyde sulfoxylate, sodium ethylenediaminetetraacetate, ferrous sulfate, dextrose, sodium pyrophosphate, and sodium sulfite. If the above-exemplified polymerization initiators are used, the initiation of polymerization reaction may be carried out smoothly.

The polymerization initiator may be injected in 0.01 to 1 parts by weight, preferably, 0.001 to 0.5 parts by weight based on 100 parts by weight of the conjugated diene-based monomer. If the polymerization initiator is used in an amount less than the lower limit, the initiation of polymerization may not be carried out smoothly, and if an amount is greater than the upper limit, the physical properties of a conjugated diene-based polymer finally prepared may be adversely influenced.

2) Polymerization Reaction Step

In the method for preparing a conjugated diene-based polymer provided in the present invention, a step of injecting the remaining conjugated diene-based monomer and an emulsifier in installments after initiating the polymerization reaction and performing polymerization reaction is included.

In this step, the remaining monomer excluding the monomer injected in the polymerization initiation step among 100 parts by weight of the conjugated diene-based monomer to be polymerized, is injected, and the monomer and the emulsifier are injected in three or more installments. The injection number in installments may be three or more, preferably, three to five, particularly preferably, three to four. If the injection number in installments is less than the lower limit, the uniform polymerization of the monomer may not be achieved, and if the injection number in installments is greater than the upper limit, process operation may become difficult. In this step, the standard of the injection point in installments may be a polymerization conversion ratio.

In this step, the amount of the conjugated diene-based monomer injected in installments may be equal to or less than the amount of the conjugated diene-based monomer injected immediately before. For example, if 30 parts by weight the conjugated diene-based monomer is injected in the polymerization initiation step, the amount of the conjugated diene-based monomer injected in the first installment during performing the polymerization reaction may be equal to or less than 30 parts by weight, particularly, 25 parts by weight, and the amount of the conjugated diene-based monomer injected in the second installment during performing the polymerization reaction may be equal to or less than 25 parts by weight, for example 15 parts by weight. As described above, by controlling the amount of the conjugated diene-based monomer injected, the particle distribution of the polymer thus prepared may be maintained broad, and the reaction time may be the same as the common reaction time. Through this, the polymer finally prepared may have excellent impact strength and may be prepared with excellent productivity.

In addition, this step S2 may include a step of injecting the conjugated diene-based monomer and the emulsifier at a point where a polymerization conversion ratio is 20 to 35% (S1-1), a step of injecting the conjugated diene-based monomer and the emulsifier at a point where a polymerization conversion ratio is 45 to 60% (S1-2), and a step of injecting the conjugated diene-based monomer and the emulsifier at a point where a polymerization conversion ratio is 70 to 80% (S1-3).

In addition, in step S2-1, the conjugated diene-based monomer may be injected in 20 to 30 parts by weight, in step S2-2, the conjugated diene-based monomer may be injected in 15 to 25 parts by weight, in step S2-3, the conjugated diene-based monomer may be injected in 10 to 20 parts by weight, in steps S2-1 to S2-3, the conjugated diene-based monomer may be injected in total 70 parts by weight or less, and the amount of the conjugated diene-based injected in steps S2-1 to S2-3 may satisfy Formula 1 below.

$$M1 \geq M2 \geq M3 \qquad \text{[Formula 1]}$$

In Formula 1, M1, M2 and M3 are injection amounts of the conjugated diene-based monomer in steps S2-1, S2-2 and S2-3, respectively.

In an embodiment, in step S2-1, the conjugated diene-based monomer may be injected in 25 parts by weight at a point where a polymerization conversion ratio is 20 to 35%, in step S2-2, the conjugated diene-based monomer may be injected in 20 parts by weight at a point where a polymerization conversion ratio is 45 to 60%, and in step S2-3, the conjugated diene-based monomer may be injected in 15 parts by weight at a point where a polymerization conversion ratio is 70 to 80%. More particularly, in step S2-1, the conjugated diene-based monomer may be injected in 25 parts by weight at a point where a polymerization conversion ratio is 30%, in step S2-2, the conjugated diene-based monomer may be injected in 20 parts by weight at a point where a polymerization conversion ratio is 50%, and in step S2-3, the conjugated diene-based monomer may be injected in 15 parts by weight at a point where a polymerization conversion ratio is 70%.

In case where step S2 includes the above-described steps S2-1, S2-2 and S2-3, the polymerization reaction may be carried out smoothly, and the impact strength of the conjugated diene-based polymer thus prepared may be even better.

In the present invention, the polymerization conversion ratio may be obtained by drying 1.5 g of a conjugated diene-based polymer in a hot air drier of 150° C. for 15 minutes, measuring the weight, obtaining the total solid content (TSC), and calculating using Mathematical Formula 1 below.

Polymerization conversion ratio (%)=total solid content (TSC)×(weight of monomer and subsidiary material injected)/100−(weight of subsidiary material excluding monomer)   [Mathematical Formula 1]

In Mathematical Formula 1, the subsidiary material includes all remaining components excluding the monomer among materials injected in the polymerization reaction, and for example, an initiator, an emulsifier, etc., may correspond to the subsidiary material.

The emulsifier injected in step S2 may be one or more selected from the group consisting of a rosin acid saponified material, a fatty acid saponified material, a dimer acid saponified material and an oleic acid saponified material, and the emulsifier may also be injected in installments like the conjugated diene-based monomer.

Meanwhile, in steps S1 and S2, a molecular weight regulator may be further injected, and the total amount of the molecular weight regulator injected in step S1 and step S2 may be less than 1 part by weight based on 100 parts by weight of the conjugated diene-based monomer. If the total amount of the molecular weight regulator injected is greater than the amount, the balance of the physical properties of the conjugated diene-based polymer thus prepared may be degraded.

The molecular weight regulator may be one or more selected from the group consisting of α-methylstyrene dimer, t-dodecyl mercaptan, n-dodecyl mercaptan, n-octyl mercaptan, carbon tetrachloride, methylene chloride, methylene bromide, tetraethyl thiuram disulfide, dipentamethylene thiuram disulfide, and diisopropylxantogen disulfide.

3) Finishing Step

The method for preparing a conjugated diene-based polymer of the present invention includes a finishing step of the polymerization reaction at a point where a polymerization conversion ratio is 90 to 99% (S3). Through this step, the final conjugated diene-based polymer is prepared, and the average particle diameter of the conjugated diene-based polymer prepared through the preparation method of the present invention may be 1000 to 2000 Å, preferably, 1000 to 1500 Å.

The conjugated diene-based polymer obtained in this step may be enlarged through an enlarging step by injecting a coagulant, or a coagulant and an auxiliary coagulant after finishing the polymerization reaction (S4), and the average particle diameter of the enlarged conjugated diene-based polymer may be 2500 to 4000 Å, preferably, 2500 to 3500 Å.

If the average particle diameters of the conjugated diene-based polymer and the enlarged conjugated diene-based polymer are in the above-described ranges, the physical properties including impact strength of the polymer may be excellent.

An acid coagulant may be used as the coagulant used in this step, and particularly, sulfuric acid, acetic acid, $MgSO_4$, $CaCl_2$ or $Al_2(SO_4)_3$ may be used. As the auxiliary coagulant, a sodium auxiliary coagulant such as sodium alginate and sodium silicate, or a polymer-based polymer coagulant may be used.

Method for Preparing Graft Copolymer

The present invention provides a method for preparing a graft copolymer by graft polymerizing the conjugated diene-based polymer prepared by the aforementioned preparation method with an aromatic vinyl-based monomer and a vinyl cyan-based monomer.

The graft copolymer may include 40 to 70 wt % of the conjugated diene-based polymer, 15 to 35 wt % of the aromatic vinyl-based monomer and 5 to 25 wt % of the vinyl cyan-based monomer. If the components of the graft copolymer are within the ranges, the chemical resistance and processability of the graft copolymer may be excellent.

The graft copolymer may be prepared by mixing the conjugated diene-based polymer with the aromatic vinyl-based monomer and the vinyl cyan-based monomer, adding an emulsifier and an initiator, and performing graft polymerization. The same emulsifier and initiator explained in the preparation method of the conjugated diene-based polymer above may be used.

Thermoplastic Resin Composition

The present invention provides a thermoplastic resin composition including the graft copolymer prepared by the above-explained preparation method of a graft copolymer, and a copolymer including a derived unit from the aromatic vinyl-based monomer and a derived unit from the vinyl cyan-based monomer.

Particularly, the copolymer including the derived unit from the aromatic vinyl-based monomer and the derived unit from the vinyl cyan-based monomer may be a styrene-acrylonitrile copolymer. In the thermoplastic resin composition, the amount of the graft copolymer may be 10 to 50 wt %.

The thermoplastic resin composition may be extruded or injected to manufacture a molded product, and the molded product may be used in various uses including electrical components, electronic components, automobile parts, etc.

Hereinafter, preferred embodiments will be suggested to assist the understanding of the present invention. However, the embodiments are only for illustrating the present invention, and the scope of the present invention is not limited thereto.

Example 1

To a nitrogen-substituted polymerization reactor (autoclave), 90 parts by weight of ion-exchange water, 35 parts by weight of 1,3-butadiene as a conjugated diene-based monomer, 0.8 parts by weight of a dimer acid saponified material which was a mixture of one or more among the compounds represented by Chemical Formulae 1 to 6 as an emulsifier, 0.25 parts by weight of potassium carbonate as an electrolyte, 0.044 parts by weight of potassium hydroxide, 0.25 parts by weight of t-dodecyl mercaptan as a molecular weight regulator, 0.04 parts by weight of t-butyl hydroperoxide as a reaction initiator, 0.02 parts by weight of dextrose, 0.0015 parts by weight of sodium pyrophosphate and 0.0007 parts by weight of ferrous sulfate were injected, the temperature was elevated to 55° C., and polymerization reaction was initiated.

After initiating the polymerization reaction, at a point where a polymerization conversion ratio reached 30%, 25 parts by weight of 1,3-butadiene, 0.1 parts by weight of t-dodecyl mercaptan as a molecular weight regulator, 0.05 parts by weight of potassium persulfate and 0.15 parts by weight of a dimer acid saponified material as an emulsifier were injected, the temperature was elevated to 78° C. and maintained, and polymerization reaction was performed for 6 hours.

In a next step, at a point where a polymerization conversion ratio reached 50%, 25 parts by weight of 1,3-butadiene, 0.1 parts by weight of t-dodecyl mercaptan as a molecular weight regulator, 0.15 parts by weight of a dimer acid saponified material, 0.05 parts by weight of potassium carbonate and 0.01 parts by weight of potassium hydroxide were injected in order, and at a point where a polymerization conversion ratio reached 70%, 15 parts by weight of 1,3-butadiene, 0.1 parts by weight of t-dodecyl mercaptan as a molecular weight regulator, 0.15 parts by weight of a dimer acid saponified material, 0.05 parts by weight of potassium carbonate and 0.01 parts by weight of potassium hydroxide were injected in order. At a point where a polymerization conversion ratio reached 95%, the reaction was finished.

The average particle diameter of the polybutadiene thus prepared was 1280 Å, and the standard deviation of the particle diameter was 350 Å. To the polybutadiene thus prepared, 0.8 parts by weight of acetic acid was added to obtain enlarged polybutadiene, and the average particle diameter of the enlarged polybutadiene was 3270 Å, and the standard deviation of the particle diameter was 920 Å.

Example 2

Enlarged polybutadiene was obtained by adding 0.3 parts by weight of sodium alginate and 0.6 parts by weight of acetic acid to the polybutadiene prepared in Example 1.

The average particle diameter of the enlarged polybutadiene was 3230 Å, and the standard deviation of the particle diameter was 992 Å.

Example 3

To a nitrogen-substituted polymerization reactor (autoclave), 90 parts by weight of ion-exchange water, 30 parts by weight of 1,3-butadiene as a conjugated diene-based monomer, 0.75 parts by weight of a dimer acid saponified material which was a mixture of one or more among the compounds represented by Chemical Formulae 1 to 6 as an emulsifier, 0.25 parts by weight of potassium carbonate as an electrolyte, 0.044 parts by weight of potassium hydroxide, 0.25 parts by weight of t-dodecyl mercaptan as a molecular weight regulator, 0.04 parts by weight of t-butyl hydroperoxide as a reaction initiator, 0.02 parts by weight of dextrose, 0.0015 parts by weight of sodium pyrophosphate and 0.0007 parts by weight of ferrous sulfate were injected, the temperature was elevated to 55° C., and polymerization reaction was initiated.

After initiating the polymerization reaction, at a point where a polymerization conversion ratio reached 25%, 25 parts by weight of 1,3-butadiene, 0.1 parts by weight of t-dodecyl mercaptan as a molecular weight regulator, 0.05 parts by weight of potassium persulfate and 0.1 parts by weight of a dimer acid saponified material as an emulsifier were added, the temperature was elevated to 78° C. and maintained, and polymerization reaction was performed for 6 hours.

In a next step, at a point where a polymerization conversion ratio reached 35%, 15 parts by weight of 1,3-butadiene, 0.1 parts by weight of t-dodecyl mercaptan as a molecular weight regulator, 0.1 parts by weight of a dimer acid saponified material, 0.05 parts by weight of potassium carbonate and 0.01 parts by weight of potassium hydroxide were injected in order, and at a point where a polymerization conversion ratio reached 50%, 15 parts by weight of 1,3-butadiene, and 0.1 parts by weight a dimer acid saponified material were injected.

Then, at a point where a polymerization conversion ratio reached 70%, 15 parts by weight of 1,3-butadiene, 0.1 parts by weight of t-dodecyl mercaptan as a molecular weight regulator, 0.15 parts by weight of a dimer acid saponified material, 0.05 parts by weight of potassium carbonate and 0.01 parts by weight of potassium hydroxide were injected in order. At a point where a polymerization conversion ratio reached 95%, the reaction was finished.

The average particle diameter of the polybutadiene thus prepared was 1260 Å, and the standard deviation of the particle diameter was 282 Å. To the polybutadiene thus prepared, 0.3 parts by weight of sodium alginate and 0.7 parts by weight of acetic acid were added to obtain enlarged polybutadiene, and the average particle diameter of the enlarged polybutadiene was 3290 Å, and the standard deviation of the particle diameter was 870 Å.

Comparative Example 1

To a nitrogen-substituted polymerization reactor (autoclave), 75 parts by weight of ion-exchange water, 90 parts by weight of 1,3-butadiene as a monomer, 3 parts by weight of a dimer acid saponified material as an emulsifier, 0.1 parts by weight of potassium carbonate as an electrolyte, 0.1 parts by weight of t-dodecyl mercaptan as a molecular weight regulator, 0.15 parts by weight of t-butyl hydroperoxide as a reaction initiator, 0.06 parts by weight of dextrose, 0.005 parts by weight of sodium pyrophosphate and 0.0025 parts by weight of ferrous sulfate were injected in one batch, the temperature was elevated to 55° C., and polymerization reaction was performed until a polymerization conversion ratio reached 30 to 40%.

After that, 0.3 parts by weight of potassium persulfate was injected in one batch, the temperature was elevated to 72° C., 10 parts by weight of remaining 1,3-butadiene was injected in one batch at a point where a polymerization conversion ratio reached 60 to 70%, and polymerization reaction was performed. The reaction was finished at a point where a polymerization conversion ratio reached 95%. The average particle diameter of the polybutadiene thus prepared was 1220 Å, and the standard deviation of the particle diameter was 210 Å. To the polybutadiene thus prepared, 1.5 parts by weight of acetic acid was added for enlarging, and the average particle diameter of the enlarged polybutadiene was 3290 Å, and the standard deviation of the particle diameter was 690 Å.

Comparative Example 2

Enlarged polybutadiene was obtained by adding 0.3 parts by weight of sodium alginate and 1.32 parts by weight of acetic acid to the polybutadiene prepared in Comparative Example 1.

The average particle diameter of the enlarged polybutadiene was 3230 Å, and the standard deviation of the particle diameter was 823 Å.

Comparative Example 3

To a nitrogen-substituted polymerization reactor (autoclave), 90 parts by weight of ion-exchange water, 50 parts by weight of 1,3-butadiene as a conjugated diene-based monomer, 1.1 parts by weight of a dimer acid saponified material which was a mixture of one or more among the compounds represented by Chemical Formulae 1 to 6 as an emulsifier, 0.27 parts by weight of potassium carbonate as an electrolyte, 0.06 parts by weight of potassium hydroxide, 0.25 parts by weight of t-dodecyl mercaptan as a molecular weight regulator, 0.04 parts by weight of t-butyl hydroperoxide as a reaction initiator, 0.02 parts by weight of dextrose, 0.0015 parts by weight of sodium pyrophosphate and 0.0007 parts by weight of ferrous sulfate were injected, the temperature was elevated to 55° C., and polymerization reaction was initiated.

After initiating the polymerization reaction, at a point where a polymerization conversion ratio reached 40%, 0.1 parts by weight of t-dodecyl mercaptan as a molecular weight regulator, 0.05 parts by weight of potassium persulfate and 0.15 parts by weight of a dimer acid saponified material as an emulsifier were injected, the temperature was elevated to 78° C. and maintained, and polymerization reaction was performed for 6 hours.

In a next step, at a point where a polymerization conversion ratio reached 50%, 35 parts by weight of 1,3-butadiene, 0.1 parts by weight of t-dodecyl mercaptan as a molecular weight regulator, 0.15 parts by weight of a dimer acid saponified material, 0.05 parts by weight of potassium carbonate and 0.01 parts by weight of potassium hydroxide were injected in order, and at a point where a polymerization conversion ratio reached 70%, 15 parts by weight of 1,3-butadiene, 0.1 parts by weight of t-dodecyl mercaptan as a molecular weight regulator, 0.15 parts by weight of a dimer acid saponified material, 0.05 parts by weight of potassium carbonate and 0.01 parts by weight of potassium hydroxide were injected in order. At a point where a polymerization conversion ratio reached 95%, the reaction was finished.

The average particle diameter of the polybutadiene thus prepared was 1235 Å, the standard deviation of the particle diameter was 242 Å. To the polybutadiene thus prepared, 0.3 parts by weight of sodium alginate and 1.1 parts by weight of acetic acid were added to obtain enlarged polybutadiene, and the average particle diameter of the enlarged polybutadiene was 3225 Å, and the standard deviation of the particle diameter was 835 Å.

Manufacture of ASBS DP and Injection Specimen

To 60 parts by weight of each of the polybutadienes prepared in the Examples and Comparative examples and 1000 parts by weight of ion-exchange water, a mixture solution including 12 parts by weight of acrylonitrile, 28 parts by weight of styrene, 20 parts by weight of ion-exchange water, 0.4 parts by weight of a dimer acid saponified material and 0.35 parts by weight of t-dodecyl mercaptan, mixed in a separate mixing apparatus, 0.12 parts by weight of t-butyl hydroperoxide, 0.054 parts by weight of dextrose, 0.004 parts by weight of sodium pyrophosphate and 0.002 parts by weight of ferrous sulfate were continuously injected at 70° C. for three hours.

After finishing the injection, 0.05 parts by weight of dextrose, 0.03 parts by weight of sodium pyrophosphate, 0.001 parts by weight of ferrous sulfate and 0.05 parts by weight of t-butyl hydroperoxide were injected in one batch, the temperature was elevated to 80° C. over one hour, and the reaction was finished to prepare an acrylonitrile-butadiene-styrene (ABS) graft copolymer.

To the ABS graft copolymer thus prepared, 0.8 to 2 parts by weight of MgSO₄ was injected for coagulation, and then, washed and dried to obtain an ABS powder (DP). 27 parts by weight of the ABS powder thus obtained and 73 parts by weight of styrene-acrylonitrile (SAN, Mw=120,000, acrylonitrile content of 27%) were mixed to obtain a thermoplastic resin composition. The thermoplastic resin composition thus obtained was extruded and injected to obtain an injection specimen.

Example 4 and Comparative Example 4

In the manufacturing process of the injection specimen of Example 1, a mixture of the polybutadiene and enlarged polybutadiene in Example 1 was used in 1:2 instead of 60 parts by weight of single polybutadiene, and 1.2 parts by weight of MgSO₄ was used to prepare a graft copolymer and an injection specimen, and this corresponded to Example 4.

In the manufacturing process of the injection specimen of Example 1, a mixture of the polybutadiene and enlarged polybutadiene in Comparative Example 1 was used in 1:2 instead of 60 parts by weight of single polybutadiene and parts by weight of MgSO₄ was used to prepare a graft copolymer and an injection specimen, and this corresponded to Comparative Example 4.

The average particle diameter of the polybutadiene and enlarged polybutadiene prepared in the Examples and Comparative Examples, the standard deviation of particle diameter, a conversion ratio into polybutadiene (PBL), a conversion ratio into ABS graft copolymer, and parts by weight of MgSO₄ injected for manufacturing an injection specimen for each case are summarized in Table 1 below.

TABLE 1

|  |  | Average particle diameter (Å) | Standard deviation of particle diameter (Å) | PBL conversion ratio | ABS conversion ratio | Parts by weight of MgSO₄ injected |
|---|---|---|---|---|---|---|
| Example 1 | Polybutadiene | 1280 | 350 | 95.0 | 95.3 | 0.7 |
|  | Enlarged polybutadiene | 3270 | 920 |  | 95.7 | 1 |
| Example 2 | Enlarged polybutadiene | 3230 | 992 |  | 95 | 0.8 |
| Example 3 | Polybutadiene | 1260 | 282 | 95.1 | 95.8 | 0.7 |
|  | Enlarged polybutadiene | 3290 | 870 |  | 95.5 | 0.8 |
| Comparative Example 1 | Polybutadiene | 1220 | 210 | 95.2 | 96.1 | 2 |
|  | Enlarged polybutadiene | 3290 | 690 |  | 95.7 | 2 |
| Comparative Example 2 | Enlarged polybutadiene | 3230 | 823 |  | 94.9 | 1.7 |
| Comparative Example 3 | Polybutadiene | 1235 | 242 | 95.3 | 95.2 | 1.45 |
|  | Enlarged polybutadiene | 3225 | 835 |  | 95.0 | 1.45 |

Experimental Example 1. Confirmation of Physical Properties of Injection Specimen With respect to the injection specimens manufactured in the Examples and Comparative Examples, physical properties were measured using the methods below.

Izod impact strength (IMP, kgfcm/cm): measured by making a notch in pellet specimens with a thickness of ⅛ inch and ¼ inch according to ASTM D256.

Reflection haze: reflection haze was measured using a gloss specimen and adding a gloss numerical between 17 to 19° and 21 to 23° according to standard measurement of ASTM E430. If the reflection haze measured by this method is small, it means that the reflection haze of the injection specimen is excellent.

The physical properties measured are summarized in Table 2 below.

TABLE 2

|  | Polybutadiene type | ¼ inch IMP | ⅛ inch IMP | Reflection haze |
|---|---|---|---|---|
| Example 1 | Polybutadiene | 5.2 | 6.7 | 0.8 |
|  | Enlarged polybutadiene | 23.1 | 23.4 | 1.8 |
| Example 2 | Enlarged polybutadiene | 23.5 | 24.3 | 1.4 |
| Example 3 | Polybutadiene | 3.8 | 5.7 | 1.0 |
|  | Enlarged polybutadiene | 22.7 | 23.3 | 1.4 |
| Example 4 | Polybutadiene/ Enlarged polybutadiene | 18.2 | 18.3 | 0.9 |
| Comparative Example 1 | Polybutadiene | 3.2 | 5.0 | 1.7 |
|  | Enlarged polybutadiene | 21.8 | 22.7 | 2.7 |
| Comparative Example 2 | Enlarged polybutadiene | 22.3 | 23.0 | 2.3 |
| Comparative Example 3 | Polybutadiene | 3.6 | 5.2 | 1.4 |
|  | Enlarged polybutadiene | 22.2 | 22.9 | 2.2 |

TABLE 2-continued

| | Polybutadiene type | ¼ inch IMP | ⅛ inch IMP | Reflection haze |
|---|---|---|---|---|
| Comparative Example 4 | Polybutadiene/ Enlarged polybutadiene | 16.1 | 15.0 | 1.6 |

From the results, it was confirmed that the injection specimen manufactured from the thermoplastic resin including the conjugated diene-based polymer prepared by the preparation method of the present invention showed even better impact strength and reflection haze.

Experimental Example 2. Confirmation of Generation Amount of Coagulum During Polymerization and Coagulating with Acetic Acid The weight of coagulum produced in the reaction bath of the Examples and Comparative Examples, the weight of total polymer and the weight of monomer were measured, and the solid coagulum contents of conjugated diene-based polymers were calculated using Mathematical Formula 2 below and are shown in Table 3.

Solid coagulum content=weight of coagulum produced in a reaction bath (g)/weight of total polymer and weight of monomer (100 g)  [Mathematical Formula 2]

TABLE 3

| | Polybutadiene type | Generation amount of small-sized coagulum prepared | Generation amount of large-sized coagulum |
|---|---|---|---|
| Example 1 | Polybutadiene | 0.02 | — |
| | Enlarged polybutadiene | — | 0.043 |
| Example 2 | Enlarged polybutadiene | — | 0.045 |
| Example 3 | Polybutadiene | 0.0175 | — |
| | Enlarged polybutadiene | — | 0.04 |
| Example 4 | Polybutadiene/ Enlarged polybutadiene | — | 0.023 |
| Comparative Example 1 | Polybutadiene Enlarged polybutadiene | 0.018 — | — 0.041 |
| Comparative Example 2 | Enlarged polybutadiene | — | 0.045 |
| Comparative Example 3 | Polybutadiene Enlarged polybutadiene | 0.021 — | — 0.037 |
| Comparative Example 4 | Polybutadiene/ Enlarged polybutadiene | — | 0.021 |

From the results, it was confirmed that if the preparation method according to an embodiment of the present invention was used, the coagulum was generated to a similar degree as the method of the comparative embodiments.

Experimental Example 3. Confirmation of Generation Amount of Gas During Injection The total amounts of volatile organic compounds (VOC) generated from 1 g of the graft copolymers prepared in the Examples and Comparative Examples at 250° C. for 1 hour were analyzed using HS-GC/MSD. The results are shown in Table 4 below.

TABLE 4

| | Polybutadiene type | Generation amount of gas (ppm) |
|---|---|---|
| Example 1 | Polybutadiene | 1170 |
| | Enlarged polybutadiene | 1590 |
| Example 2 | Enlarged polybutadiene | 1260 |
| Example 3 | Polybutadiene | 1210 |
| | Enlarged polybutadiene | 1520 |
| Example 4 | Polybutadiene/ Enlarged polybutadiene | 1620 |
| Comparative Example 1 | Polybutadiene Enlarged polybutadiene | 1930 2580 |
| Comparative Example 2 | Enlarged polybutadiene | 2310 |
| Comparative Example 3 | Polybutadiene Enlarged polybutadiene | 1727 1840 |
| Comparative Example 4 | Polybutadiene/ Enlarged polybutadiene | 2490 |

From the results, it was confirmed that if the preparation method according to an embodiment of the present invention was used, the generation amount of gas during injection was small, and the specimen had a uniform surface when compared with the conventional method or the method of comparative embodiments.

Experimental Example 4. Confirmation of Remaining Mg Content in ABS Powder

The Mg contents remaining in the ABS powders prepared in the Examples and Comparative Examples were confirmed using inorganic material content analysis through ICP Mass, and the results are shown in Table 5 below.

TABLE 5

| | Polybutadiene type | Remaining Mg content (ppm) |
|---|---|---|
| Example 1 | Polybutadiene | 550 |
| | Enlarged polybutadiene | 690 |
| Example 2 | Enlarged polybutadiene | 632 |
| Example 3 | Polybutadiene | 572 |
| | Enlarged polybutadiene | 659 |
| Example 4 | Polybutadiene/ Enlarged polybutadiene | 780 |
| Comparative Example 1 | Polybutadiene Enlarged polybutadiene | 1320 1370 |
| Comparative Example 2 | Enlarged polybutadiene | 1150 |
| Comparative Example 3 | Polybutadiene Enlarged polybutadiene | 843 865 |
| Comparative Example 4 | Polybutadiene/ Enlarged polybutadiene | 1220 |

From the results, it was confirmed that if the preparation method of the present invention was used, the remaining Mg content was small, and the physical properties of the conjugated diene-based polymer could be excellent.

The invention claimed is:

1. A method for preparing a conjugated diene-based polymer, the method comprising:
   injecting 30 to 50 parts by weight of a conjugated diene-based monomer among 100 parts by weight, 0.1 to 5 parts by weight of a dimer acid saponified material, and a polymerization initiator into a reactor in one batch, and initiating polymerization reaction (S1);
   injecting the remaining conjugated diene-based monomer and an emulsifier in three or more installments according to a polymerization conversion ratio after initiating the polymerization reaction (S2); and finishing the polymerization reaction at a point where the polymerization conversion ratio is 90 to 99% (S3), wherein step S2 comprises:

injecting the conjugated diene-based monomer and the emulsifier at a point where the polymerization conversion ratio is 20 to 35% (S2-1);

injecting the conjugated diene-based monomer and the emulsifier at a point where the polymerization conversion ratio is 45 to 60% (S2-2); and injecting the conjugated diene-based monomer and the emulsifier at a point where the polymerization conversion ratio is 70 to 80% (S2-3).

2. The method for preparing a conjugated diene-based polymer according to claim 1, wherein step S2 is injecting the remaining conjugated diene-based monomer and the emulsifier in three or four installments.

3. The method for preparing a conjugated diene-based polymer according to claim 1, wherein an amount of the conjugated diene-based monomer injected in installments is equal to or less than an amount of the conjugated diene-based monomer injected immediately before.

4. The method for preparing a conjugated diene-based polymer according to claim 1, wherein 20 to 30 parts by weight of the conjugated diene-based monomer is injected in step S2-1, 15 to 25 parts by weight of the conjugated diene-based monomer is injected in step S2-2, 10 to 20 parts by weight of the conjugated diene-based monomer is injected in step S2-3, and a total amount of the conjugated diene-based monomer injected in steps S2-1 to S2-3 is 70 parts by weight or less.

5. The method for preparing a conjugated diene-based polymer according to claim 1, wherein the amount injected of the conjugated diene-based monomer injected in steps S2-1 to S2-3 satisfies the following Formula 1:

$$M1 \geq M2 \geq M3 \quad \text{[Formula 1]}$$

where M1, M2 and M3 are injection amounts of the conjugated diene-based monomer in steps S2-1, S2-2 and S2-3, respectively.

6. The method for preparing a conjugated diene-based polymer according to claim 1, wherein the dimer acid is one or more selected among compounds represented by the following Chemical Formulae 1 to 6:

[Chemical Formula 1]

[Chemical Formula 2]

[Chemical Formula 3]

[Chemical Formula 4]

[Chemical Formula 5]

[Chemical Formula 6]

7. The method for preparing a conjugated diene-based polymer according to claim 1, wherein the polymerization initiator is one or more among a water-soluble polymerization initiator, and a mixture of an oil-soluble polymerization initiator and an oxidation-reduction system catalyst.

8. The method for preparing a conjugated diene-based polymer according to claim 7, wherein the water-soluble polymerization initiator is one or more selected from the group consisting of potassium persulfate, sodium persulfate and ammonium persulfate, the oil-soluble polymerization initiator is one or more selected from the group consisting of cumene hydroperoxide, diisopropylbenzene hydroperoxide, azobisisobutyronitrile, tert-butyl hydroperoxide, paramenthane hydroperoxide, and benzoyl peroxide, and the oxidation-reduction system catalyst is one or more selected from the group consisting of sodium formaldehyde sulfoxylate, sodium ethylenediaminetetraacetate, ferrous sulfate, dextrose, sodium pyrophosphate, and sodium sulfite.

9. The method for preparing a conjugated diene-based polymer according to claim 1, wherein the polymerization initiator is injected in 0.01 to 1 parts by weight based on 100 parts by weight of the conjugated diene-based monomer.

10. The method for preparing a conjugated diene-based polymer according to claim 1, wherein a molecular weight regulator is further injected in step S1 and step S2, and a total amount of the molecular weight regulator injected in step S1 and step S2 is less than 1 part by weight based on 100 parts by weight of the conjugated diene-based monomer.

11. The method for preparing a conjugated diene-based polymer according to claim 1, wherein the emulsifier is one or more selected from the group consisting of a rosin acid saponified material, a fatty acid saponified material, a dimer acid saponified material and an oleic acid saponified material.

12. The method for preparing a conjugated diene-based polymer according to claim 1, wherein an average particle diameter of the conjugated diene-based polymer is 1000 to 2000 Å.

13. The method for preparing a conjugated diene-based polymer according to claim 1, further comprising:
    injecting a coagulant, or a coagulant and an auxiliary coagulant for enlargement after finishing the polymerization reaction (S4),
    wherein the average particle diameter of the conjugated diene-based polymer is 2500 to 4000 Å.

14. A method for preparing a graft copolymer, the method comprising graft polymerizing the conjugated diene-based polymer prepared by the preparation method according to claim 1 with an aromatic vinyl-based monomer and a vinyl cyan-based monomer.

15. A thermoplastic resin composition, comprising:
    the graft copolymer prepared by the preparation method of claim 14; and
    a copolymer comprising a derived unit from the aromatic vinyl-based monomer and a derived unit from the vinyl cyan-based monomer.

* * * * *